United States Patent
Steele (10) Patent No.: US 10,272,361 B2
(45) Date of Patent: Apr. 30, 2019

(54) ESSENTIAL OIL EXTRACTION, RECOVERY, AND PURGE SYSTEM

(71) Applicant: ESSENTIAL INNOVATIONS, INC., Edmonds, WA (US)

(72) Inventor: Casey Steele, Edmonds, WA (US)

(73) Assignee: ESSENTIAL INNOVATIONS, INC., Edmonds, WA (US)

( * ) Notice: Subject to any disclaimer, the term of this patent is extended or adjusted under 35 U.S.C. 154(b) by 0 days.

(21) Appl. No.: 15/610,346

(22) Filed: May 31, 2017

(65) Prior Publication Data

US 2018/0345169 A1 Dec. 6, 2018

(51) Int. Cl.
| | |
|---|---|
| A61L 2/00 | (2006.01) |
| B01D 11/02 | (2006.01) |
| B01D 1/00 | (2006.01) |
| C10G 1/02 | (2006.01) |
| C11B 1/10 | (2006.01) |

(52) U.S. Cl.
CPC ...... *B01D 11/0215* (2013.01); *B01D 11/0296* (2013.01); *C11B 1/10* (2013.01)

(58) Field of Classification Search
CPC ............ B01D 11/0219; B01D 11/0288; B01D 11/0292; B01D 11/0207; C11B 1/10; C11B 9/02
USPC ....... 422/253, 261, 276, 284–285, 292, 300, 422/307, 311; 137/544; 196/104, 119
See application file for complete search history.

(56) References Cited

U.S. PATENT DOCUMENTS

| | | | |
|---|---|---|---|
| 2,199,670 A | * | 5/1940 | Lowry ............... B01D 11/0226 159/DIG. 29 |
| 4,808,426 A | | 2/1989 | Strop et al. |
| 6,111,119 A | | 8/2000 | Trout |
| 7,001,880 B1 | | 2/2006 | Yomogida et al. |
| 2002/0074292 A1 | | 6/2002 | Schlegel et al. |
| 2002/0127316 A1 | | 9/2002 | Trout |
| 2010/0089132 A1 | | 4/2010 | Larter et al. |
| 2011/0133120 A1 | | 6/2011 | McGhee |
| 2012/0251642 A1 | * | 10/2012 | Gu ...................... B01D 11/023 424/757 |
| 2014/0193303 A1 | | 7/2014 | Ellis et al. |

(Continued)

FOREIGN PATENT DOCUMENTS

| | | |
|---|---|---|
| CN | 103254049 A | 8/2013 |
| WO | 2017/024072 A1 | 2/2017 |

OTHER PUBLICATIONS

International Search Report and Written Opinion, dated Nov. 2, 2016, for corresponding International Application No. PCT/US2016/45422, 9 pages.

(Continued)

Primary Examiner — Monzer R Chorbaji
(74) Attorney, Agent, or Firm — Seed IP Law Group LLP (57) ABSTRACT

A system and method of extracting essential oils from plant material through the use of a low pressure alcohol-based closed system that includes a solvent chamber connected to a material column that in turn is connected to a kettle. Plant material in the material column and the solvent in the solvent chamber are cooled using a cooling liquid, such as nitrogen. A vacuum pump connected to the kettle creates a vacuum in the kettle to draw the cooled solvent through the cooled plant material and extract essential oils, which are collected in the kettle.

8 Claims, 4 Drawing Sheets

(56) References Cited

U.S. PATENT DOCUMENTS

2016/0045422 A1    2/2016   Huang et al.

OTHER PUBLICATIONS

International Search Report and Written Opinion dated Jul. 2, 2018 for International Application No. PCT/US2018/035462, 8 pages.

* cited by examiner

ESSENTIAL OIL EXTRACTION, RECOVERY, AND PURGE SYSTEM

BACKGROUND

Technical Field

The present disclosure pertains to a system for extracting essential oils from plant material and, more particularly, to a closed extraction system that utilizes a novel oil separator to extract essential oil from the plant material and enable recovery of solvent used in the process.

Description of the Related Art

Many plants include oils and other minerals that have various uses and benefits apart from the fibrous plant material itself. Essential oils, once removed from the plant material, can be used in foods, medicines, and other products. Typical methods of extracting essential oils use highly pressurized systems to force a solvent through the plant material. These systems can be expensive and are very dangerous due to the high pressures.

BRIEF SUMMARY

In accordance with the present disclosure a system and method of extracting essential oils from plant material through the use of a vacuum closed system employing an oil separation kettle is provided.

In accordance with one aspect of the present disclosure, a device is provided that includes a container having an exterior sidewall enclosing an interior space, a removable dish, a first port to receive steam, a second port to exhaust steam, a third port to receive a mixture of extracted oil and solvent, and a fourth port to output solvent vapor, the container further including an interior jacket formed on the sidewall and capable of receiving steam to heat the interior space and extracted oil in the interior space to a temperature that causes solvent in the extracted oil to evaporate and form a vapor.

In accordance with another aspect of the present disclosure, the container has an open bottom and the removable dish is attached to the container to close the open bottom and collect essential oil.

In accordance with a further aspect of the present disclosure, the device further includes an insulated space between the jacket and the exterior sidewall of the container.

In accordance with yet another aspect of the present disclosure, a system is provided that includes a solvent source, a material container structured to contain plant material, the material container in fluid communication with the solvent source, a filter system in fluid communication with the material container, and an oil separation kettle in fluid communication with the filter system, the oil separation kettle including a heat jacket capable of heating the kettle.

In accordance with another aspect of the present disclosure, the system includes a condenser coupled to the kettle and structured to receive vapor from the kettle and reduce the vapor to a liquid, a collection tank coupled to the condenser and structured to receive the liquid from the condenser, and a vacuum pump in fluid communication with the collection tank and structured to remove air from within the collection tank and pull solvent from the solvent source through the plant material in the material container to extract oil from the plant material and move the extracted oil into the kettle.

In accordance with a further aspect of the present disclosure, the kettle is capable of receiving steam into the heat jacket to cause heating of the kettle and contents of the kettle. Ideally the kettle is capable of being heated by steam to a temperature that causes solvent to evaporate in the kettle.

In accordance with still yet another aspect of the present disclosure, the system further includes a source of steam coupled to the material container.

In accordance with another aspect of the present disclosure, a method is provided that includes introducing plant material into a material container; introducing a cooling liquid into the material container; providing a solvent for introduction into the material container; creating a vacuum in a kettle that is in fluid communication with the material container, and heating the kettle; and pulling the solvent through the plant material to extract oil from the plant material and pulling the mixture of solvent and extracted oil into the kettle with the vacuum from the material container and separating the solvent from the oil by heating the kettle to a temperature that causes the solvent to evaporate out of the mixture of solvent and oil and form a solvent vapor.

In accordance with another aspect of the present disclosure, the method further includes removing the solvent vapor from the kettle, condensing the solvent vapor into a liquid solvent, and collecting the liquid solvent in a collection tank.

In accordance with still yet another aspect of the present disclosure, the heating the kettle includes introducing steam into a steam jacket on the kettle to heat the kettle.

In accordance with a further aspect of the present disclosure, the cooling liquid is liquid nitrogen or glycol and the solvent is an alcohol-based solvent.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the following drawings, wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with filters, vacuum pumps, as well as the process of purging solvents from extracted plant oils have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

With reference to FIGS. 1-9, shown therein is a system 100 to extract oils, such as essential oils, from plant material and plant-based materials. As described more fully below, the system 100 generally includes a solvent source, a material container structured to contain plant material, the material column in fluid communication with the solvent source, a kettle in fluid communication with the material container, and a vacuum source in fluid communication with the kettle and structured to remove air from within the kettle and pull solvent from the solvent source through plant material in the material column to extract oil from the plant material and move the extracted oil into the kettle.

Figure 1:
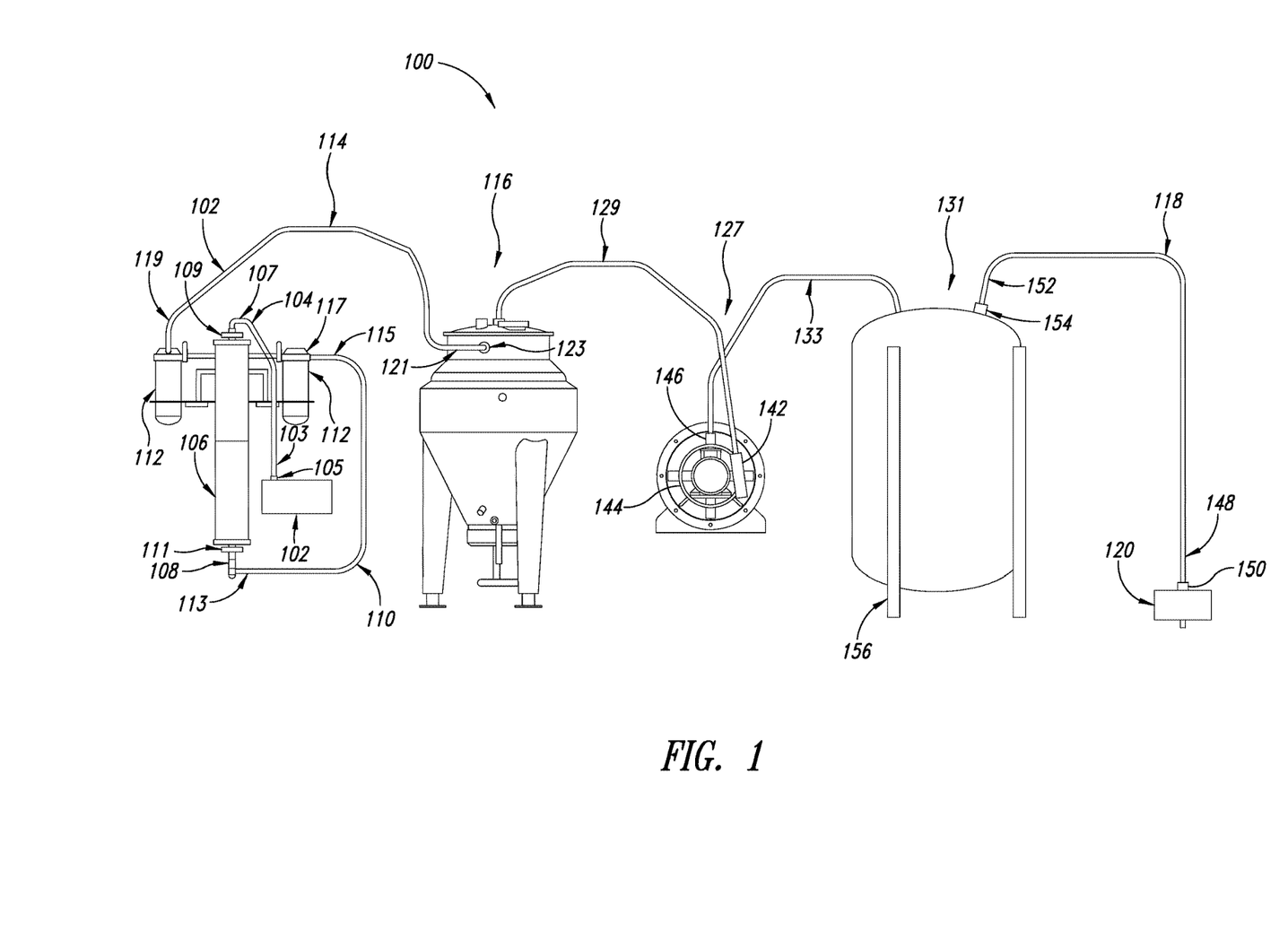
FIG. 1 is a system diagram of an implementation of an essential oil extraction, recovery and purge system in accordance with one implementation of the present disclosure.

More particularly, with reference to FIG. 1, shown therein is a representative implementation of the essential oil extraction, recovery, and purge system 100 that includes a solvent source in the form of a solvent chamber 102, a material container in the form of a material column 106 coupled to the solvent chamber 102 with a supply line 104, one or more filters 112 coupled to the column 106 with a first recovery line 110, and at least one kettle 116 coupled to the filter 112 with a second recovery line 114. A condenser 127 is coupled to the kettle 116 via a transfer tube 129 and is capable of condensing solvent vapor recovered from the kettle 116 into a liquid solvent form that is then conveyed to a collection tank 131 via a collection tube 146. The system also utilizes a vacuum source in the form of a vacuum pump 120 coupled to the collection tank 121 via a vacuum line 118.

The solvent chamber 102 preferably has a fluid output, the material container 106 has a fluid input and a fluid output, and the fluid input of the material column 106 is in fluid communication with the fluid output of the solvent chamber 102. The filter 112 has a fluid input and a fluid output, the fluid input of the filter 112 is in fluid communication with the fluid output of the material column 106, and the kettle 116 has a fluid input in fluid communication with the fluid output of the filter 112.

In more detail, the solvent chamber 102 is connected to and in fluid communication with the material column 106 through the supply line 104. A first end 103 of the supply line 104 is connected to a fluid output 105 of the solvent chamber 102, and a second end 107 of the supply line 104 is connected to a fluid input 109 of the material column 106.

The material column 106 is connected to and in fluid communication with the filter 112 through a valve 108 via the first recovery line 110. A second end or output 111 of the material column 106, which is opposite of the fluid input 109 at the first end of the material column 106, is connected to the valve 108. A first end 113 of the first recovery line 110 is connected to a side of the valve 108 opposite of the side that is connected to the second end 111 of the material column 106 such that when the valve 108 is opened, a fluid (i.e., solvent and extracted material, such as essential oil) can flow from the material column 106 to the first recovery line 110. A second end 115 of the first recovery line 110 is connected to a fluid input 117 of one or more filters 112.

Figure 2:
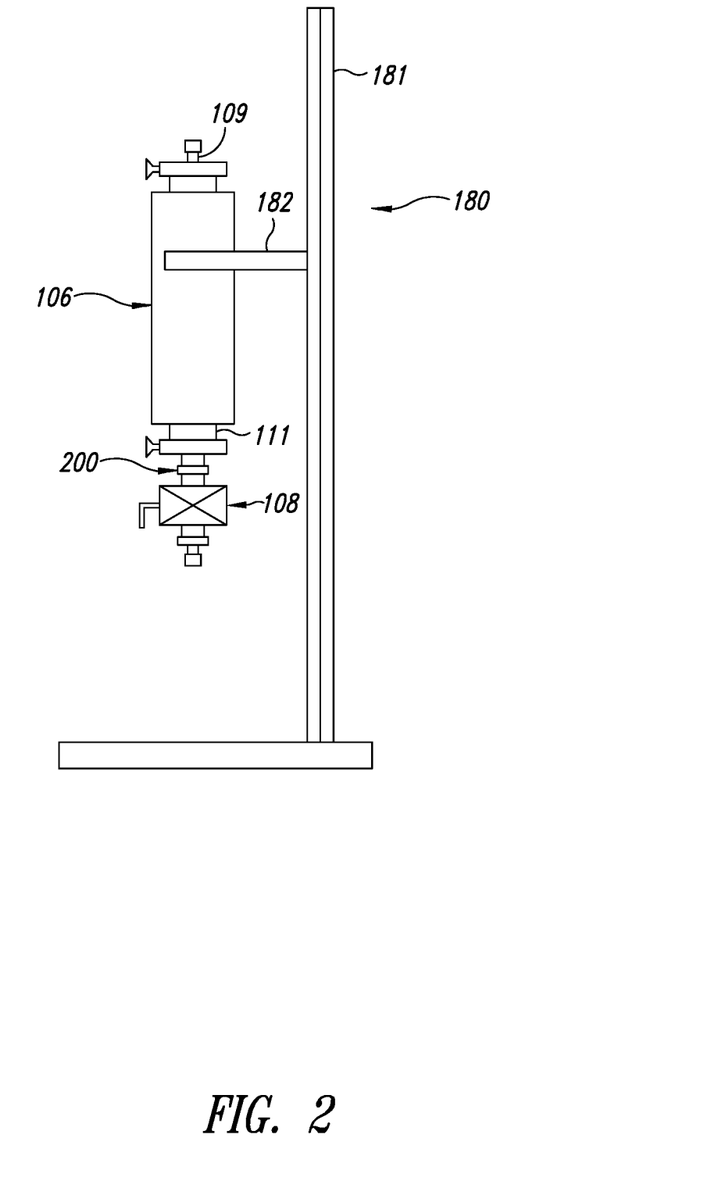
FIG. 2 is a cross-sectional view of a material column stand in accordance with the present disclosure.

FIG. 2 is a side view of the material column 106 mounted on a material column stand 180 formed in accordance with the present disclosure. In this illustration, the material column 106 is connected to an upright post 181 on the stand 180 by a bracket 182. This mounting configuration maintains an orientation of the material column 106, such that the top 109 of the material column 106 (and the supply line) are positioned above the bottom 111 of the material column 106 (and the valve 108 and first recovery line 110). The bracket 182 may be movably mounted in the stand 180 to enable selective raising and lowering of the material column 106 by a user.

A filter pad 200 is placed between the valve 108 and the second end of the material column 106. In some implementations, the filter pad 200 may be positioned inside and at the bottom of the material column 106. In other implementations, the filter pad 200 may be positioned outside of the material column 106 but between the second end 111 of the material column 106 and the valve 108. In some implementations, a valve assembly may include the filter pad 200 and the valve 108. In at least one implementation, the filter pad 200 is a stainless steel filter pad. The filter pad 200 is readily commercially available and is well known to those skilled in the art and will, therefore, not be described in detail herein. It should be recognized that other filters may be used that restrict material from exiting the material column 106 and entering the first recovery line 110 while allowing fluid (e.g., solvent and essential oils removed from the material) to flow from the material column 106 to the first recovery line 110. Once the filter pad 200 is in position, the valve 108 is connected to the second end 111 of the material column 106.

The filters 112 are connected in series to and in fluid communication with the kettle 116 through the second recovery line 114. A first end 119 of the second recovery line 114 is connected to an output of the filter 112, and a second end 121 of the second recovery line 114 is connected to an input 123 of the kettle 116.

The kettle 116 is also connected to the condenser 127 via the transfer tube 129. The condenser includes a first manifold 142 that receives the vapor solvent from the kettle 116, a coil 144 coupled to the first manifold 142, and a second manifold 146 coupled to the other end of the coil 144. The collection tube 146 conveys the condensed liquid solvent from the condenser 127 to the collection tank 131. The collection tank has a drain with valve on the bottom. It also has a manway at the top for full access if any cleaning or repair is needed.

FIGS. 3-7 illustrate the kettle 116 and its construction in greater detail. The kettle 116 is formed in this implementation to have an inverted cone-shaped base 202 from which three legs 204 extend in spaced parallel relationship. A self-leveling foot 206 is at a distal end of each leg 204. The base 202 has an open bottom that opens to a hollow interior of the base 202. Covering the open bottom of the base 202 is a dish 208 held in place by a known clamping mechanism 210, in this case a ball screw and plate 212, 214, which is shown in more detail in the enlarged partial side view of FIG. 6. The ball screw and plate 212, 214 are a well-known clamping system that will not be described in detail herein. The dish 208 is sealed in place with a known gasket or seal arrangement that likewise is known and will not be described in detail herein. To drain the oil from the kettle 116, the ball screw and plate 212, 214, are removed, and the dish 208 is lowered from the bottom of the kettle 16 for emptying, after which it is reattached with the ball screw and plate 212, 214. It is to be understood that other draining mechanisms may be used, including without limitation a simple valve, drain plug, and drain line.

Figure 3:
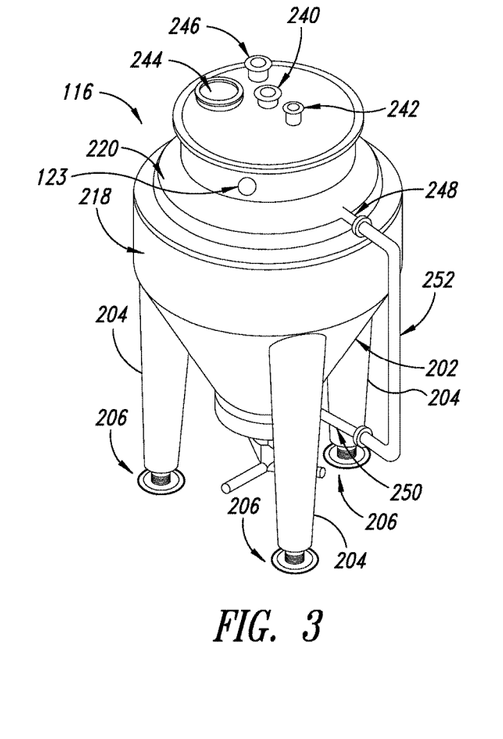
FIG. 3 is a pictorial view of a kettle used in the system of FIG. 1 in accordance with the present disclosure.

A drain outlet 216 extends from the base 202 and is in fluid communication with the interior of the base 202. This can be used to drain the kettle 116 if needed. In addition, a ball check valve (not shown) can be used to prevent excess fluid from exiting the kettle 116 at any of the output ports. A float switch can also be used in combination with the ball check valve or without the ball check valve that shuts down the kettle heat if the heat level rises above a threshold level. The ball float provides an extra measure of protection in the event the float switch fails. As the liquid rises in the kettle 116, the ball rises inside the housing and blocks the vacuum, thereby preventing any further liquid from being drawn into the kettle 116. A housing for the ball float has holes in a top thereof to allow the vacuum to pull through the system while holes in a bottom of the housing allow liquid in the kettle 116 to raise the ball and ultimately plug the vacuum port when the kettle 116 is full.

Figure 5:
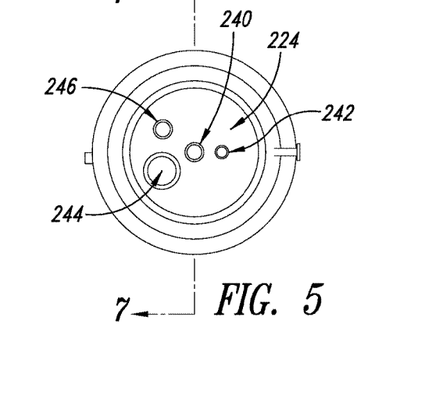
FIG. 5 is a top plan view of the kettle of FIG. 3.

The kettle 116 also includes a cylindrical sidewall 218 integrally formed at the top of the base 202, and a top portion 220 integrally formed with the sidewall 218. The sidewall 218 and the top portion 220 enclose hollow interior space 222 that cooperated with the hollow interior of the base 202 to form an enclosed storage space for the recovered oil and solvent. A cover 224, shown more clearly in the top view of FIG. 5, is removably attached to the top portion 220 to cover a manway that provides access to the interior space 222 for cleaning, etc. In the partial cross section view of FIG. 7 can be seen the internal construction of the base 202, sidewall 218, and top portion 220. An exterior wall 226 and interior wall 228 define a space in which a water jacket 230 is defined by a water jacket wall 232. Between the water jacket wall 232 and the exterior wall 226 is defined an enclosed insulation space 234. The water jacket 230 is constructed to carry steam under pressure to heat the interior space 222 of the kettle 116 and the recovered essential oil and solvent mixture. The steam used to heat the kettle 116 is obtained from a source of steam that is not shown or described herein but is readily commercially available. The steam is conveyed into and out of the water jacket 230 through a steam input port and a steam output port in the back side of the kettle 116. The heating is done to a temperature in the range of 170 degrees F. to 190 degrees F. and more preferably at about 180 degrees F. to cause the solvent, such as alcohol, to evaporate out of the mixture. The steam supply for the kettle heating is at 5 psi. The temperature is changed by lowering or raising the pressure, which is standard boiler operation. Temperature may be monitored by a temperature prove in the dish 208 or a probe near the center of the kettle 116.

On the cover 224 there is an outlet 240 for the alcohol vapor, an alternative vacuum hook up 242 as an alternative to hooking vacuum to the collection tank, and openings 244, 246 that are actually for pressure relief and a gauge, respectively. FIG. 1 shows a first option of having the vacuum pump pulling through the condenser 127 to perform a vacuum distillation. Alternatively, but not as efficient, the vacuum pump 120 is connected directly to the kettle 116 through the port 242 on the right for the fluid extraction. Once the process is finished, the port 242 would be closed and standard distillation would proceed. The vapor would exit through the center port 240 without the assistance of vacuum. It would flow under its own pressure into the collection tank 131.

Figure 4:
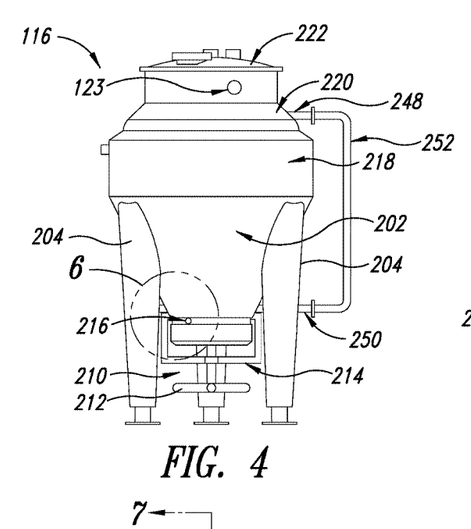
FIG. 4 is a side elevation of the kettle of FIG. 3.

FIGS. 3 and 4 show two pipes 248, 250 extending out the right side of the kettle 116. A site level 252 in the form of a clear tube connects to the two pipes 248, 250 to provide a visual indicator of the level of fluid in the kettle 116.

In operation, the vacuum from the vacuum pump 120 pulls the extracted oil from the material column 106 into the kettle 116. The extracted oil will include some amount of the liquid alcohol solvent used in the preferred process. By heating the kettle 116 with the steam, the mixture inside in the kettle 116 will heat to a temperature that causes the alcohol to evaporate out of the mixture, leaving the oil to fall to the bottom of the kettle 116 where it is collected by an oil collector, in this case the dish 208. Purging is then done after all the solvent (in the preferred implementation—alcohol) is gone and oil is left in the dish 208. To purge, vacuum is applied to pull out any residual solvent or alcohol that may be trapped in the oil (in other industries this is known as degassing).

Figure 8:
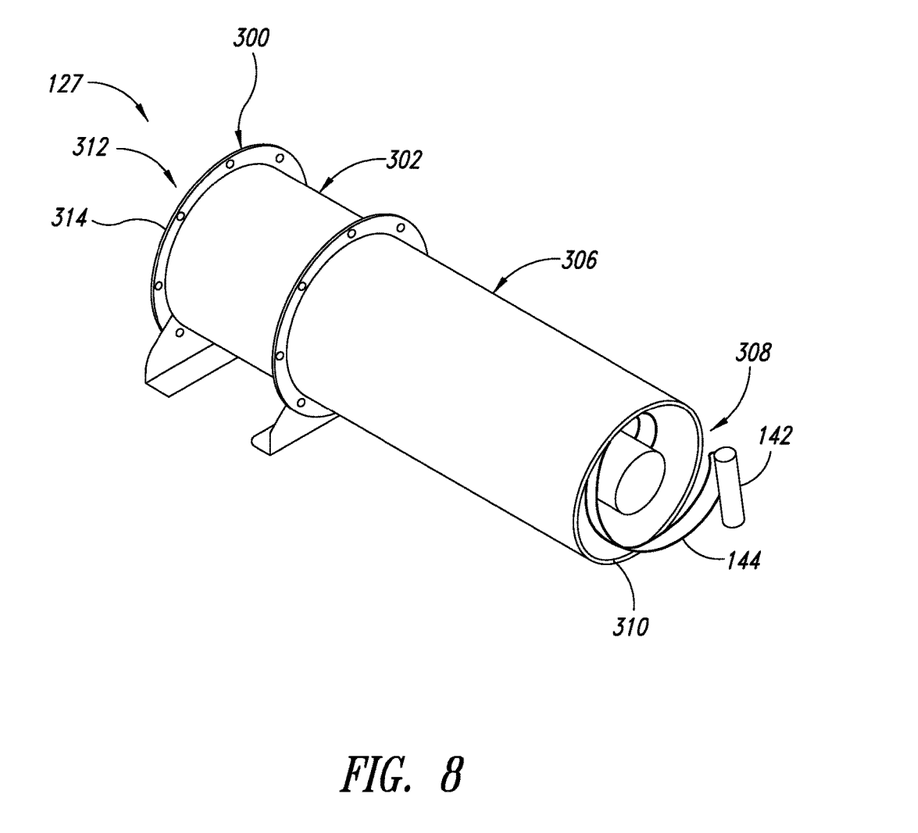
FIG. 8 is a pictorial illustration of a condenser formed in accordance with the present disclosure.

Referring next to FIG. 8, the condenser can be a conventional condenser used to reduce solvent vapor to a liquid form or, alternatively, the condenser 127 shown in FIG. 8 can be employed. As illustrated, the condenser 127 has a housing 300 that includes a fan cowling 302, in side which a rotary fan 304 is mounted (seen in FIG. 1), and a condenser housing 306 coupled to the fan cowling 302 and sized and shaped to receive air from the rotary fan 304. An intake opening 308 is formed at a first end 310 of the housing 300 that is suitably screened for protection and filtering. The condenser housing 300 has an exhaust opening 312 to exhaust air from the housing 300 at a second end 314 of the housing 300. Both the fan cowling 302 and the condenser housing 306 have a cylindrical shape with hollow interiors and are formed of solid metal or plastic material to retain the air inside the housing 300 as the air flows from the intake 308 at the first end 310 of the housing 300 to the exhaust opening 312 at the second end 314 of the housing 300

Inside the condenser housing 306 is the condenser tube or coil 144 that is in liquid communication with the kettle 116 via the input manifold 142 and the transfer tube 129 that conveys evaporated solvent vapor from kettle 116. The condenser 127 condenses the vapor to a liquid solvent that is output via the second manifold 146 coupled to an output end of the condenser coil 144. In one implementation, the solvent vapor comes into the condenser 127 through a 2 inch line that is coupled to the first manifold 142. The manifold splits the 2 inch line into 12 lines of $\frac{3}{8}$ inch diameter each, which form the coil 144 that extends through the housing 300 to go through the cooling process. At the other end of the housing 300 the 12 lines couple to the second manifold 146 that reduces the 12 lines back into a single 2" tube 133, which then conveys the liquid solvent to the collection tank 131. The manifold sizes and quantity of $\frac{3}{8}$" cooling lines actually depends on the size of the kettle 116 being evaporated.

Referring once again to FIG. 1, the collection tank 131 is in fluid communication with the vacuum pump 120 via the vacuum line 118. Although not shown, the vacuum pump 120 can include a vapor filter. A first end 148 of the vacuum line 118 connects to an input port 150 of the vacuum pump 120 and a second end 152 of the vacuum line 118 connects to an output port 154 of the kettle 116. The vacuum pump is a conventional, readily commercial vacuum pump and will not be described in detail herein.

The collection tank 131 is essentially a large cylindrical tank having legs to support the tank 131 on a floor or other support structure. A drain (not shown) and manway (not shown) can be provided in the bottom or top of the tank, respectively, or on the side wall of the tank 131 as desired. A ball float or ball check valve (not shown) can be used in controlling the level of liquid solvent in the tank 131 and prevent the liquid entering the vacuum pump. As the liquid rises in the tank 131, the ball rises inside the housing and blocks the vacuum, thereby preventing any further liquid from being drawn into the tank 131. A housing for the ball float has holes in a top thereof to allow the vacuum to pull through the system while holes in a bottom of the housing allow liquid in the tank 131 to raise the ball and ultimately plug the vacuum port when the tank 131 is full. In addition, a float switch can be used in combination with the ball check valve or without the ball check valve that shuts down the kettle heat if the heat level rises above a threshold level.

To understand the basic operation of the system 100 before going into greater detail on the components, the steps for using this system 100 and the resulting process will now be described. Generally, the above-described system 100 is designed to implement a method of extracting essential oils from plant material. The method generally includes the steps of introducing plant material into the material column 106, introducing a cooling liquid into the material column 106, providing a solvent for introduction into the material column 106, creating a vacuum in the kettle 116 that is in fluid communication with the material column 106, and pulling the solvent through the plant material to extract oil from the plant material and pulling the solvent and extracted oil into the kettle 116 with the vacuum from the vacuum pump 120. Preferably, the plant material in the material container is cooled, either by pre-cooling in a deep freezer or other similar cooling system, or cooled within the system such as with liquid nitrogen, prior to pulling the solvent through the plant material. Additionally or in the alternative, the solvent can be cooled prior to being pulled through the plant material. This cooling of the solvent can be done by deep freezing the solvent or using a cooling liquid, such as liquid nitrogen that is introduced into the solvent container. A jacketed material container, such as a column, can be used with a cooling agent in the jacket to cool material in the container. Ethanol alcohol is recommended as a solvent because it is considered safe for human consumption; however, any solvent that remains liquid under normal atmospheric pressure and temperature maybe appropriate. Isopropyl, hexane, and naphtha are also a commonly used solvent.

The foregoing system is an improvement over the System and Method for Extracting Essential Oils disclosed by the applicant in published PCT application no. PCT/US2016/045422, International Publication Number WO 2017/024072, which is incorporated in its entirety herein by reference. Included in that application are a description of a plunger for cleaning the material column. In addition, the following is a description from this pending application:

> FIG. 4 is a cross-sectional view of the material column 106 formed in accordance with the present disclosure. As described elsewhere, a filling cone 139 may be attached to the top of the material column 106 to assist a user in adding material 144 into a material receptacle 140 in the interior 135 of the material column 106. Once the material 144 has been added to the material column 106, the filling cone 139 is removed from the material column 106 and the material column 106 is connected to the remainder of the system as described above. In some implementations, the material receptacle 140 may be surrounded by insulation 142 to help maintain the cooled temperature of the material.

> A top cap 235 is connected to the material receptacle 140 by a clamp 238. In some implementations, a gasket 240 may be positioned between the top cap 235 and a top of the material receptacle 140 to help seal the material column 106. The top cap 235 of the material column 106 includes a coupler 234, which connects to coupler 236 at the second end 107 of the supply line 104.

> A bottom cap 251 is connected to the material receptacle 140 by a clamp 250. In various implementations, a gasket 248 may be positioned between the bottom cap 251 and a bottom of the material receptacle 140 to help seal the material column 106. In some implementations a filter pad 246 is positioned within the material receptacle 140 at the bottom of the material receptacle 140. In other implementations, the filter pad 246 is positioned outside the material receptacle 140 and between the bottom of the material receptacle 140 and the bottom cap 251. The bottom cap 251 of the material column 106 connects to the valve 108. The valve 108 connects to the first end of the first recovery line 110 via couplers 252 and 254. In some implementations the bottom cap 251, the valve 108, and the coupler 252 may be part of a valve assembly, which, in some implementations, may also include the filter pad 246.

> FIG. 5 is a cross-sectional view of the filter 112 formed in accordance with the present disclosure. Filter 112 includes filter material 160 and couplers 158 and 162. In some implementations, the filter material 160 may be a charcoal filter. The second end 115 of the first recovery line 110 connects to the filter 112 via two couplers 156 and 158. The first end 119 of the second recovery line 114 connects to the filter 112 via the two couplers 162 and 164. It should be recognized that other types or configurations of the filter 112 may be used. In addition, the filter 112 may take the form of multiple filter assemblies or filters coupled in series.

Figure 6:
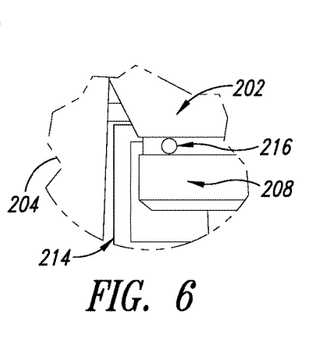
FIG. 6 is a partial, enlarged side elevation of a bottom of the kettle of FIG. 3.
Figure 7:
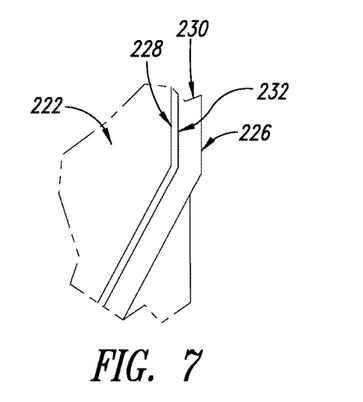
FIG. 7 is a partial, enlarged cross-section of a wall of the kettle of FIG. 3.

> FIG. 6 is a cross-sectional view of the recovery chamber 116 and vacuum pump 120 formed in accordance with the present disclosure. The recovery chamber 116 includes a recovery lid 171 that has a vacuum gauge 170 so that a user can observe the current pressure in the recovery chamber 116. It should be recognized that the vacuum gauge 170 may be another type of pressure sensor and may be positioned inside the recovery chamber 116 or connected to the recovery chamber 116 in other configurations. The second end 121 of the second recovery line 114 connects to the recovery chamber 116 via the couplers 166 and 168. In some implementations, a first end 175 of a final recovery line 173 is attached to coupler 168 and a second end 177 of the final recovery line 173 terminates in the recovery chamber 116.

> The first end 125 of the vacuum line 118 connects to the vacuum pump 120 via two couplers 176 and 178, and the second end 129 of the vacuum line 118 connects to the recovery chamber 116 via two couplers 172 and 174. In this way, the vacuum pump 120 pulls air out of the recovery chamber 116 via the vacuum line 118. Solvent 218 is then pulled from the solvent chamber 102 through the material and into the recovery chamber 116 via the second recovery line 114 and the final recovery line 173. The recovered material then settles on a bottom of the recovery chamber 116.

Although the couplers illustrated in FIGS. 1-6 are male/female connections and arranged in specific configurations, implementations are not so limited and other arrangements or types of couplers may be used so long as they are configured to properly mate together and provide a sealed connection.

The present disclosure provides several distinguishing improvements over the prior process and system described in the published PCT application described above. One improvement is the use of the kettle 116. By enabling heating of the recovered mixture of oil and solvent during the extraction process, a more purified oil is obtained. In addition, the solvent is safely and efficiently recovered in liquid form via the condenser 127 and the collection tank 131. This enables separation of the solvent from the oil for large scale extraction operations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A non-pressurized, closed, vacuum-only oil extraction system for plant materials, comprising:
   a material container structured to retain plant material and solvent;
   an oil separation kettle in fluid communication with the material container and structured to receive liquid containing solvent and separated oil from the material container, the oil separation kettle including a heat jacket capable of heating the kettle to form solvent vapor from the liquid in the kettle;
   a condenser having only one fluid input in direct fluid communication with only the kettle and only one fluid output and capable of receiving solvent vapor from the kettle and reducing the solvent vapor to a liquid solvent;
   a collection tank directly connected to the fluid output of the condenser to be in fluid communication with the condenser and structured to receive and store liquid solvent from the condenser; and
   a vacuum pump having a vacuum port directly connected only to the collection tank, wherein the vacuum pump, collection, condenser, oil separation kettle, and material container form a closed system, the vacuum pump capable of continuously removing air from within the collection tank to create a continuous vacuum in the collection tank, in the condenser, in the oil separation kettle, and in the material container to continuously pull solvent through the plant material and extract oil from the plant material and form liquid containing extracted oil from the plant material and solvent, to draw the liquid containing extracted oil and solvent into the oil separation kettle, to form solvent vapor from liquid in the oil separation kettle in response to heating of the heat jacket, and to then pull solvent vapor from the oil separation kettle into the condenser to condense liquid solvent from solvent vapor, and to thereafter pull liquid solvent from the condenser into the collection tank with the continuous vacuum.

2. The system of claim 1 wherein the kettle is capable of receiving steam into the heat jacket to cause heating of the kettle and contents of the kettle.

3. The system of claim 2 wherein the kettle is capable of being heated by steam to a temperature that causes solvent to evaporate in the kettle.

4. The system of claim 3 further comprising a source of steam coupled to the oil separation kettle.

5. A closed plant oil extraction system, comprising:
   a material container to contain plant material and solvent;
   an oil separation kettle having an input directly connected to the material container to receive liquid containing solvent and separated oil from the material container, the oil separation kettle including a heat jacket to heat the kettle and form solvent vapor from the liquid in the kettle;
   a condenser having a fluid output and further having a fluid input connected to only the kettle to receive solvent vapor from the kettle and reduce the solvent vapor to a liquid solvent;
   a collection tank directly connected to the fluid output of the condenser to receive and store liquid solvent from the condenser; and
   a vacuum pump having a vacuum port directly connected only to the collection tank, wherein the vacuum pump, collection, condenser, oil separation kettle, and material container form a closed extraction system.

6. The system of claim 5 further comprising a source of steam coupled to the oil separation kettle.

7. The system of claim 5 wherein the material container has a jacket to receive a cooling liquid for cooling solvent in the material container.

8. The system of claim 5 further comprising a filter connected between the material container and the oil separation kettle.

* * * * *